United States Patent
Choi et al.

(10) Patent No.: US 10,677,339 B2
(45) Date of Patent: Jun. 9, 2020

(54) PULLEY ASSEMBLY

(71) Applicants: Hyundai Motor Company, Seoul (KR); Kia Motors Corporation, Seoul (KR)

(72) Inventors: Kum Lim Choi, Seoul (KR); Keunseok Lee, Hwaseong-si (KR)

(73) Assignees: Hyundai Motor Company, Seoul (KR); Kia Motor Corporation, Seoul (KR)

( * ) Notice: Subject to any disclaimer, the term of this patent is extended or adjusted under 35 U.S.C. 154(b) by 303 days.

(21) Appl. No.: 15/821,021

(22) Filed: Nov. 22, 2017

(65) Prior Publication Data
US 2019/0078677 A1 Mar. 14, 2019

(30) Foreign Application Priority Data
Sep. 8, 2017 (KR) .................. 10-2017-0114879

(51) Int. Cl.
*F16H 55/36* (2006.01)
*F02N 11/00* (2006.01)
*F16D 3/64* (2006.01)

(52) U.S. Cl.
CPC ............. *F16H 55/36* (2013.01); *F02N 11/00* (2013.01); *F16D 3/64* (2013.01); *F16H 2055/366* (2013.01)

(58) Field of Classification Search
CPC ........ F16H 2055/366; F16D 3/64; F16D 3/70; F16F 15/1215
See application file for complete search history.

(56) References Cited

U.S. PATENT DOCUMENTS

| 1,698,309 | A | * | 1/1929 | Lewis | F16D 3/56 |
| | | | | | 464/82 |
| 1,993,125 | A | * | 3/1935 | Tower | F16D 13/68 |
| | | | | | 192/70.17 |
| 2,029,516 | A | * | 2/1936 | Tower | F16D 13/68 |
| | | | | | 192/207 |
| 2,407,114 | A | * | 9/1946 | Tyler | F16F 15/1215 |
| | | | | | 74/411 |
| 4,262,499 | A | * | 4/1981 | Pfeifer | F16D 3/56 |
| | | | | | 464/82 |
| 5,573,461 | A | * | 11/1996 | Colford | F16D 3/62 |
| | | | | | 464/83 |
| 6,332,842 | B1 | * | 12/2001 | Tabuchi | F16D 9/06 |
| | | | | | 403/11 |

(Continued)

*Primary Examiner* — Minh Truong
(74) *Attorney, Agent, or Firm* — Morgan, Lewis & Bockius LLP (57) ABSTRACT

A pulley assembly connecting an ISG driveshaft of an ISG and an engine to each other through a belt may include: a pulley member around which the belt is wound; a spring hub fixed to an internal peripheral surface of the pulley member; an ISG hub rotatably disposed when the ISG hub is distanced from an internal peripheral surface of the spring hub by a predetermined interval and connected to the ISG driveshaft; a limit device provided in the spring hub and ISG hub and limiting a rotation of the ISG hub to rotation by a predetermined rotation angle; and a plurality of leaf springs radially inserted into the spring hub in a circumferential direction thereof, and having one end portions fixed to the spring hub and the other end portions penetrating the ISG hub.

15 Claims, 10 Drawing Sheets

(56) References Cited

U.S. PATENT DOCUMENTS

| | | | | |
|---|---|---|---|---|
| 2003/0078084 A1* | 4/2003 | Geislinger | ............... | F16D 3/56 |
| | | | | 460/100 |
| 2012/0149511 A1* | 6/2012 | Hodjat | ..................... | F16D 3/10 |
| | | | | 474/94 |
| 2013/0337952 A1* | 12/2013 | Berruet | .................. | F16H 55/36 |
| | | | | 474/94 |

* cited by examiner

PULLEY ASSEMBLY

CROSS-REFERENCE TO RELATED APPLICATION

The present application claims priority to Korean Patent Application No. 10-2017-0114879 filed on Sep. 8, 2017, the entire contents of which is incorporated herein for all purposes by this reference.

BACKGROUND OF THE INVENTION

Field of the Invention

The present invention relates to an integrated starter generator (hereinafter, referred to as an "ISG" for convenience) system. More particularly, the present invention relates to a pulley assembly for an ISG system connecting a driveshaft of the ISG system and an engine to each other through a belt.

Description of Related Art

It has been well-known to transfer a portion of an output shaft of an engine of a vehicle to belt driving accessory components using a serpentine belt in the engine. Generally, the respective components include pulleys fastened to the belt to be thus driven, and the belt is driven by an output pulley directly connected to a crankshaft of the engine.

An internal combustion engine is operated by pulse type driving force, repeats acceleration and deceleration, and generates a vibration and noise. As a result of such a changing speed, the belt driving accessory components operated by the crankshaft repeat acceleration and deceleration. Resultantly, due to a rapid variation of a speed and a vibration, durability of the belt driving accessory components may be deteriorated, and a high level of noise and vibration may be caused.

Additionally, rapid acceleration and deceleration of the engine, such as shifting, engine starting, and starting-off may not only cause slip between the belt and the pulley, but may also cause a high load in the belt.

The pulley of the belt driving accessory component is rotatably mounted on the driveshaft, and an example of the belt driving accessory component as described above includes an alternator. To increase a lifespan of the belt connecting the alternator and the engine to each other and decrease tension of the belt to increase fuel consumption, an overrunning alternator pulley (OAP) and an overrunning alternator decoupler (OAD) have been conventionally used.

The OAP includes a one-way clutch in the pulley, and the OAD includes a one-way clutch and a spring in the pulley. Furthermore, the OAD includes the spring to have vibration absorbing performance more excellent than that of the OAP, but a load is transferred through one spring, and a torsion vibration may be continuously applied to the spring to damage the spring and a spring hub.

Meanwhile, in a belt type integrated starter generator (ISG), a direction of a torque is changed at the time of starting and power generation, and the pulley using the one-way clutch or the coil spring as described above is thus not used in the belt type ISG.

Therefore, the ISG utilizes a solid type pulley in which any mechanism is not embedded. However, the solid type pulley may not absorb a vibration of the belt to cause deterioration of durability due to the slip of the belt and a decrease in fuel consumption due to an increase in tension of the belt.

The information disclosed in the present Background of the Invention section is only for enhancement of understanding of the general background of the invention and may not be taken as an acknowledgement or any form of suggestion that the present information forms the prior art already known to a person skilled in the art.

BRIEF SUMMARY

Various aspects of the present invention are directed to providing a pulley assembly for an integrated starter generator (ISG) system having advantages of absorbing, with a simple configuration, a vibration of a belt generated due to a change in a direction of a torque at the time of engine starting and power generation of the ISG system.

Various aspects of the present invention are directed to providing a pulley assembly connecting an ISG driveshaft of an ISG and an engine to each other through a belt, including: a pulley member around which the belt is wound; a spring hub fixed to an internal peripheral surface of the pulley member; an ISG hub rotatably disposed in a state in which the ISG hub is distanced from an internal peripheral surface of the spring hub by a predetermined interval and connected to the ISG driveshaft; a limit device provided in the spring hub and ISG hub and limiting rotation of the ISG hub to rotation by a predetermined rotation angle; and a plurality of leaf springs radially inserted into the spring hub in a circumferential direction, and having one end portions fixed to the spring hub and the other end portions penetrating the ISG hub.

The limit device may include: at least one first limiter protrusion protruding from the internal peripheral surface of the spring hub toward an internal center of the spring hub; and second limit protrusions protruding in pair on an external peripheral surface of the ISG hub with the first limit protrusion interposed therebetween and having a clearance formed between the second limiter protrusions and the first limiter protrusion and corresponding to the predetermined rotation angle of the ISG hub.

The spring hub may have first through-holes formed at predetermined intervals in the circumferential direction thereof.

The spring hub may have fixing grooves formed in the external peripheral surface thereof and connected to the first through-holes.

The ISG hub may have second through-holes formed at positions each corresponding to the first through-holes.

The leaf spring may include: a fixed portion coupled to the fixing groove; and a spring portion connected integrally with the fixed portion and inserted into the first and second through-holes.

The leaf spring may have a "T" shape.

Cross sections of the second through-holes may have spline curved lines formed at both sides thereof in the circumferential direction of the ISG hub.

The pulley assembly may further include bearings located between both end portions of the internal peripheral surface of the spring hub and an external peripheral surface of the ISG hub, respectively.

Various aspects of the present invention are directed to providing a pulley assembly connecting an ISG driveshaft of an ISG and an engine to each other through a belt, including: a pulley member around which the belt is wound; a spring hub fixed to an internal peripheral surface of the pulley member, having at least one first limiter protrusion protruding toward an internal center thereof, and having first through-holes formed at predetermined intervals in a circumferential direction; an ISG hub connected to the ISG driveshaft, rotatably disposed in a state in which the ISG hub is distanced from an internal peripheral surface of the spring hub by a predetermined interval, having a pair of second limiter protrusions formed on an external peripheral surface and protruding to have a clearance between the pair of second limiter protrusions and the first limiter protrusion with the first limit protrusion interposed therebetween, and having second through-holes formed at positions each corresponding to the first through-holes; bearings located between both end portions of the internal peripheral surface of the spring hub and the external peripheral surface of the ISG hub, respectively; and a plurality of leaf springs having one end portions inserted into the first through-holes and fixed to an external peripheral surface of the spring hub and the other end portions penetrating the ISG hub through the second through-holes.

The first and second limiter protrusions may limit rotation of the ISG hub to rotation by a predetermined rotation angle corresponding to the clearance.

The second limiter protrusions may be formed to be distanced from each other in the circumferential direction of the ISG hub.

The leaf spring may include: a fixed portion coupled to the external peripheral surface of the spring hub; and a spring portion connected integrally with the fixed portion and inserted into the first and second through-holes.

The spring hub may have fixing grooves formed in the external peripheral surface thereof and connected to the first through-holes.

The fixed portion may be coupled to the fixing groove.

The ISG hub may have ribs disposed at predetermined intervals in the circumferential direction and disposed in a direction in which the ISG hub is inserted into the spring hub.

The ISG hub may have second through-holes formed between the ribs.

Cross sections of the second through-holes may have spline curved lines formed at both sides thereof in the circumferential direction of the ISG hub through the ribs.

In an exemplary embodiment of the present invention, a vibration and a noise of a belt generated due to a bidirectional torque difference between the pulley member and the ISG hub at the time of engine starting and power generation of an ISG system may be decreased.

Furthermore, in an exemplary embodiment of the present invention, the leaf springs may absorb the vibration of the belt to prevent slip of the belt, resulting in a decrease in slip noise and abrasion of the belt and improvement of durability of the belt, and a decrease in tension of the belt to improve fuel consumption.

Other effects that may be obtained or are predicted by an exemplary embodiment of the present invention will be explicitly or implicitly described in a detailed description of the present invention. That is, various effects that are predicted according to an exemplary embodiment of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present application will be described more fully hereinafter with reference to the accompanying drawings, in which exemplary embodiments of the invention are shown. As those skilled in the art would realize, the described embodiments may be modified in various different ways, all without departing from the spirit or scope of the present invention.

A description for contents that are not associated with the present invention will be omitted to clearly describe the present invention, and like reference numerals designate like elements throughout the specification.

Since sizes and thicknesses of the respective components were arbitrarily shown in the accompanying drawings for convenience of explanation, the present invention is not limited to contents shown in the accompanying drawings. Furthermore, thicknesses were exaggerated to obviously represent several portions and regions.

Furthermore, in the following description, the terms "'first", "'second", and the like, will be used to distinguish components having the same configuration from each other, and will not be necessarily limited to a sequence thereof.

Throughout the present embodiment, unless explicitly described to the contrary, the word "comprise" and variations such as "comprises" or "including", will be understood to imply the inclusion of stated elements but not the exclusion of any other elements.

Furthermore, the terms "~unit", "~portion", "~means", and the like, described in the specification signifies devices of a comprehensive configuration for performing at least one function and operation.

Figure 1:
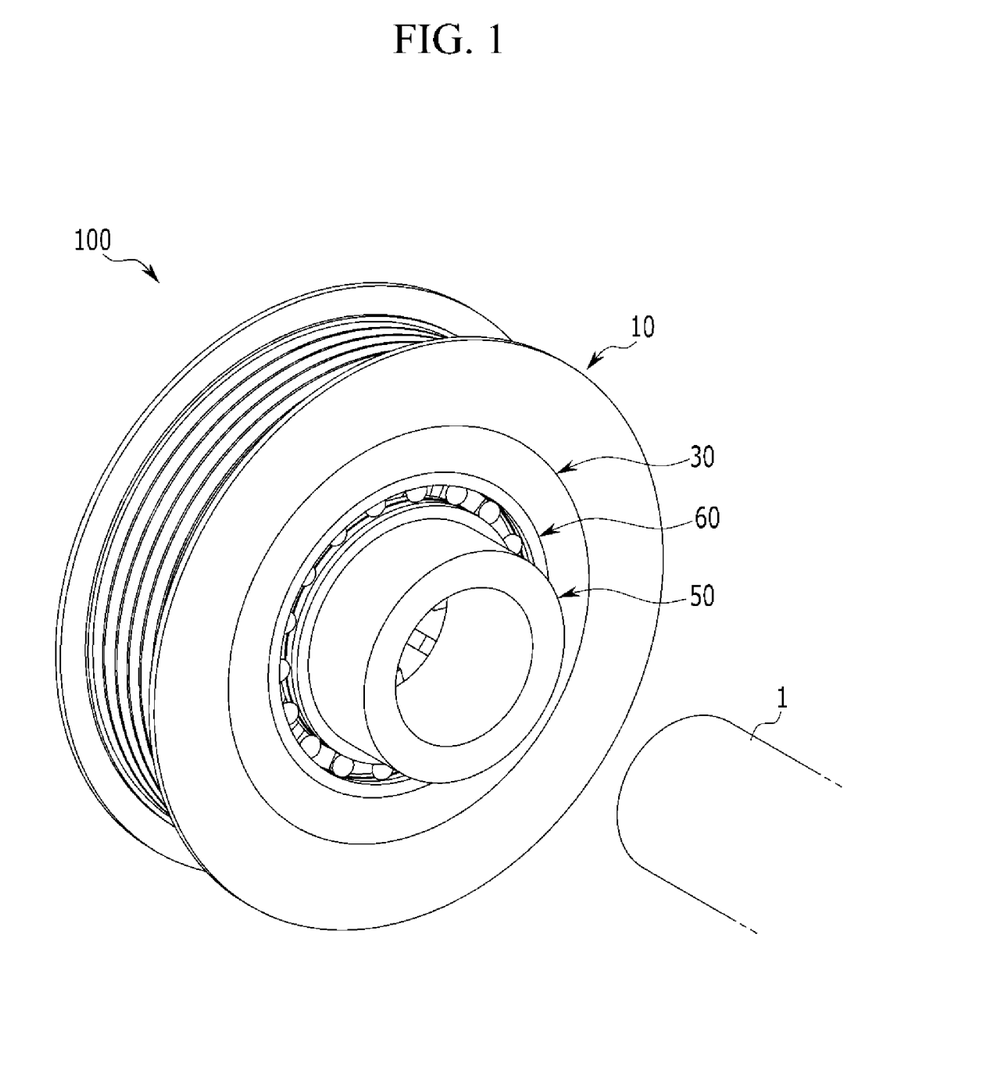
FIG. 1 is an assembled perspective view showing a pulley assembly according to an exemplary embodiment of the present invention.

FIG. 1 is an assembled perspective view showing a pulley assembly according to an exemplary embodiment of the present invention.

Referring to FIG. 1, the pulley assembly 100 according to an exemplary embodiment of the present invention may be used in a belt type integrated starter generator (ISG) system applying a starting torque to a crankshaft at the time of engine starting and generating power at the time engine driving.

Here, the ISG system basically includes a stator, a rotor disposed in the stator in a state in which it is distanced from the stator by a predetermined gap, and an ISG driveshaft 1 coaxially connected to the rotor.

The pulley assembly 100 according to an exemplary embodiment of the present invention is to connect the ISG driveshaft 1 and an engine to each other through a belt. Here, the belt may transfer a torque of the pulley assembly 100 to the engine, and may also transfer a torque of the engine to the pulley assembly 100.

The pulley assembly 100 according to an exemplary embodiment of the present invention has a structure in which it may absorb a vibration of the belt generated due to a change in a direction of a torque at the time of engine starting and power generation of the ISG system to improve durability of the belt and decrease tension of the belt to improve fuel consumption.

Figure 2:
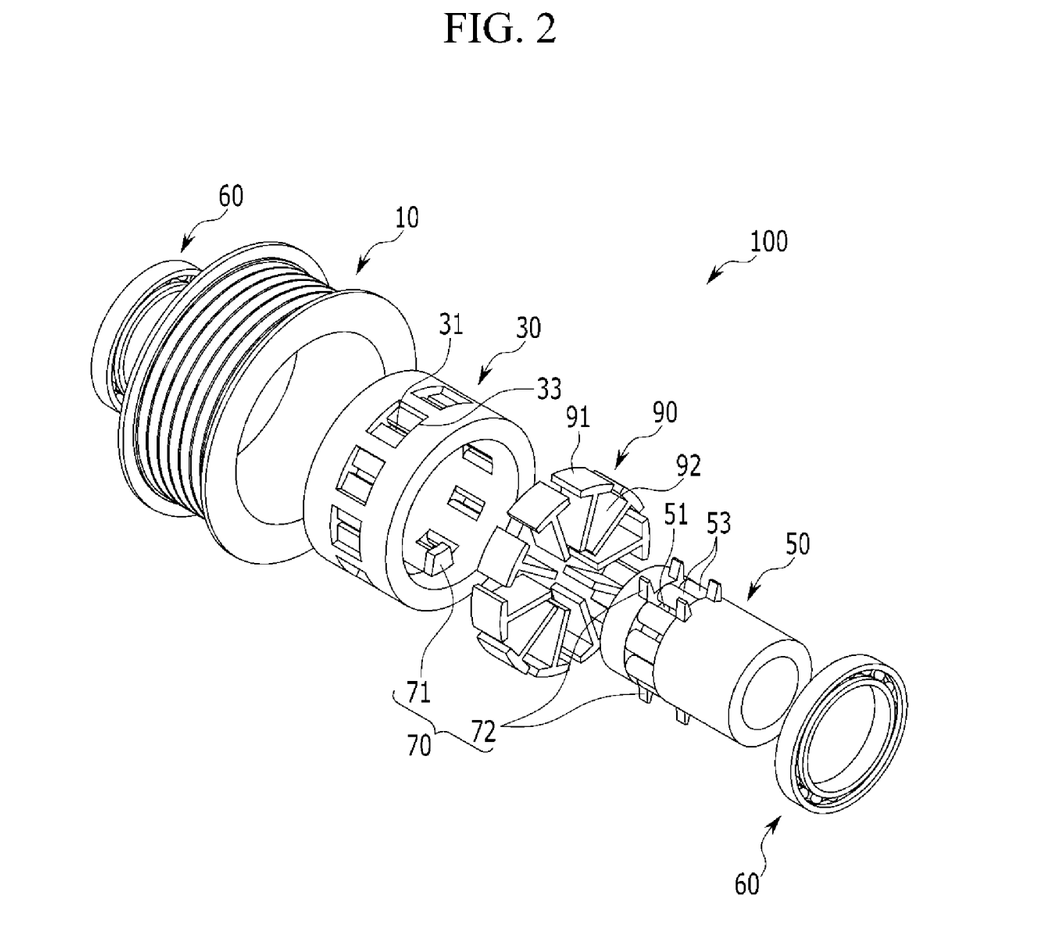
FIG. 2 is an exploded perspective view showing the pulley assembly according to an exemplary embodiment of the present invention.
Figure 3:
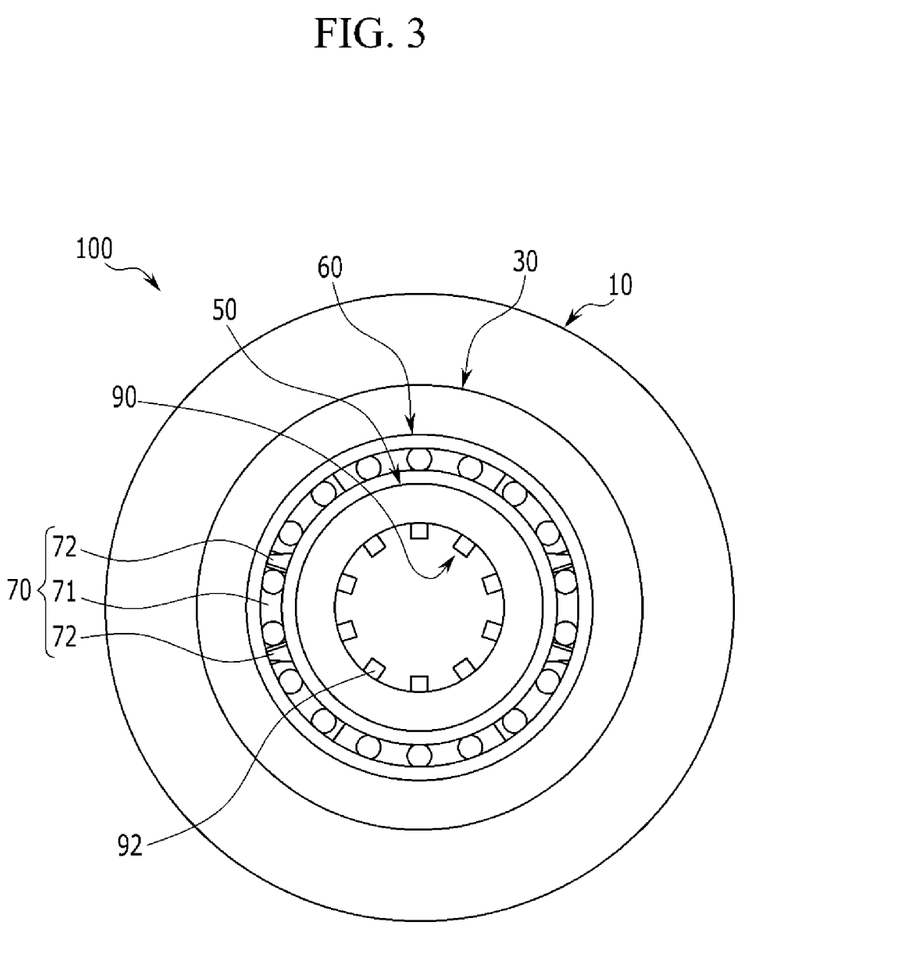
FIG. 3 is a rear view showing the pulley assembly according to an exemplary embodiment of the present invention.

FIG. 2 is an exploded perspective view showing the pulley assembly according to an exemplary embodiment of the present invention, and FIG. 3 is a rear view showing the pulley assembly according to an exemplary embodiment of the present invention.

Referring to FIG. 1, FIG. 2, and FIG. 3, the pulley assembly 100 according to an exemplary embodiment of the present invention basically includes a pulley member 10, a spring hub 30, an ISG hub 50, a limit device 70, and leaf springs 90.

Here, the pulley member 10 has an internal peripheral surface and an external peripheral surface, and a belt groove around which a belt is wound is formed in the external peripheral surface. The belt is wound around a shift pulley of the crankshaft rotating by the engine and the pulley member 10.

In an exemplary embodiment of the present invention, the spring hub 30 has a cylindrical structure having an internal peripheral surface and an external peripheral surface, and is fixed to the internal peripheral surface of the pulley member 10 inside the pulley member 10.

The spring hub 30 has first through-holes 31 formed at predetermined intervals in a circumferential direction thereof. For example, the first through-holes 31, which are rectangular holes having a rectangular shape, are radially formed toward an internal center of the spring hub 30.

Furthermore, fixing grooves 33 each connected to the first through-holes 31 are formed in the external peripheral surface of the spring hub 30. For example, the fixing grooves 33 are formed in a rectangular shape outside edge portions of the first through-holes 31.

In an exemplary embodiment of the present invention, the ISG hub 50, which has a pipe structure, is connected to the ISG driveshaft 1 of the ISG system, and is disposed inside the spring hub 30. The ISG hub 50 is rotatably disposed in the spring hub 30 in a state in which it is distanced from the internal peripheral surface of the spring hub 30 by a predetermined interval. Here, the ISG driveshaft 1 may be inserted and fixed into the ISG hub 50.

Here, to rotatably support the ISG hub 50 to the spring hub 30 in the state in which it is distanced from the internal peripheral surface of the spring hub 30 by the predetermined interval, bearings 60 are disposed between both end portions of the internal peripheral surface of the spring hub 30 and the external peripheral surface of the ISG hub 50, respectively. For example, the bearings 60 may include ball bearings.

The ISG hub 50 has second through-holes 51 formed at positions each corresponding to the first through-holes 31 of the spring hub 30 in the circumferential direction thereof.

The ISG hub 50 has ribs 53 disposed at predetermined intervals in the circumferential direction and having a circular cross section to form the second through-holes 51. The ribs 53 are disposed in a direction in which the ISG hub 50 is inserted into the spring hub 30. Here, the second through-holes 51 are formed between the ribs 53.

In an exemplary embodiment of the present invention, the limit device 70, which limits rotation of the ISG hub 50 to rotation by a predetermined rotation angle, is provided in the spring hub 30 and the ISG hub 50.

Figure 4A:
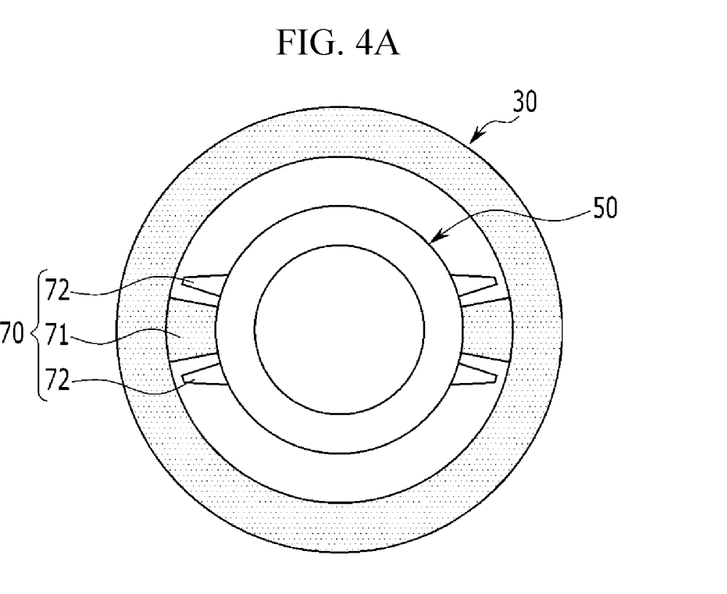
FIG. 4A and FIG. 4B are views showing a limit device used in the pulley assembly according to an exemplary embodiment of the present invention.
Figure 4B:
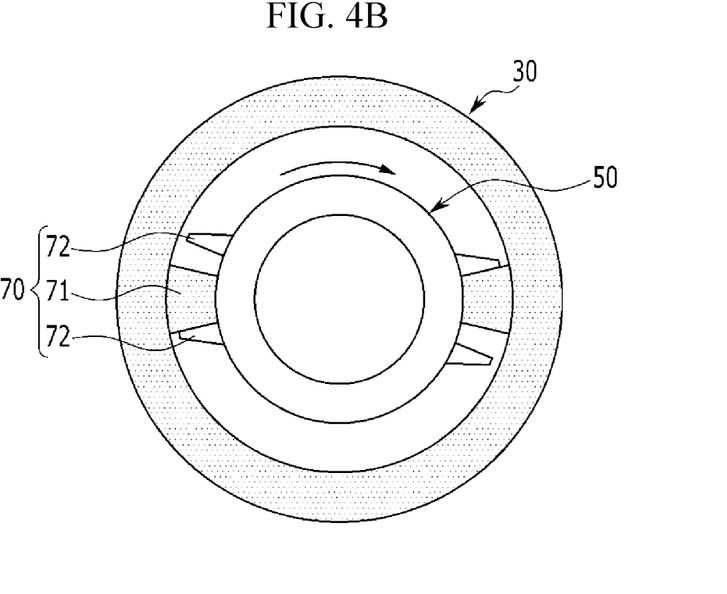

The limit device 70 includes first limit protrusions 71 provided in the spring hub 30 and second limit protrusions 72 provided in the ISG hub 50, as shown in FIGS. 2, 4A, and 4B.

Referring to FIGS. 2, 4A, and 4B, the number of first limiter protrusions 71 is at least one, and the first limiter protrusions 71 protrude from the internal peripheral surface of the spring hub 30 toward the internal center of the spring hub 30. For example, the first limiter protrusions 71 protrude from one end portion and the other end portion of the spring hub 30 in an internal diameter direction to face each other.

Furthermore, the second limit protrusions 72 protrude in pair on the external peripheral surface of the ISG hub 50 to correspond to each of the first limit protrusions 71. The pair of second limiter protrusions 72 are formed to be distanced from each other in the circumferential direction of the ISG hub 50 with the first limiter protrusion 71 interposed therebetween.

The pair of second limiter protrusions 72 have a clearance formed between the pair of second limiter protrusions 72 and the first limiter protrusion 71 and corresponding to the predetermined rotation angle of the ISG hub 50. Therefore, the first and second limiter protrusions 71 and 72 may limit the rotation of the ISG hub 50 with respect to the spring hub 30 to the rotation by the predetermined rotation angle corresponding to the clearance described above.

The reason why the first and second limiter protrusions 71 and 72 are used in the spring hub 30 and the ISG hub 50 is as follows. The ISG system is driven at a high torque at the time of the engine starting and is driven at a low torque at the time of the power generation. Therefore, a large bidirectional torque difference is generated, such that a vibration of the belt may be generated.

Therefore, in the case in which leaf springs 90 to be described below are used between the spring hub 30 and the ISG hub 50 to absorb the vibration of the belt, when an elastic coefficient of the leaf springs 90 is set to be large, the leaf springs 90 may not absorb the vibration. Furthermore, when the elastic coefficient of the leaf springs 90 is set to be small, the leaf springs 90 may absorb the vibration, but may exceed yield strength.

Therefore, in the case in which the elastic coefficient of the leaf springs 90 is set to be small, the first and second protrusions 71 and 72 of the limit device 70 allow the ISG hub 50 not to rotate by a predetermined angle or more with respect to the spring hub 30, to prevent the leaf springs 90 from exceeding the yield strength.

Referring to FIG. 2 and FIG. 3, in an exemplary embodiment of the present invention, the leaf springs 90 are configured to absorb the vibration of the belt generated due to the change in the direction of the torque at the time of the engine starting and the power generation of the ISG system.

Figure 5:
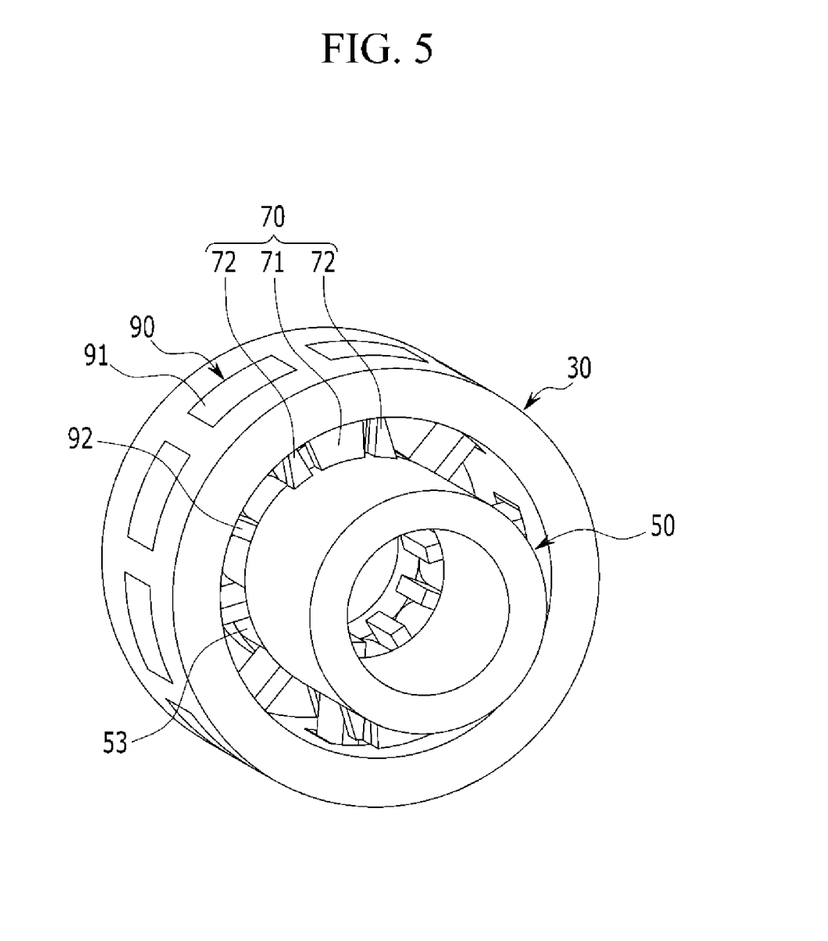
FIG. 5, FIG. 6 and FIG. 7 are views showing a coupled structure of leaf springs used in the pulley assembly according to an exemplary embodiment of the present invention.
Figure 6:
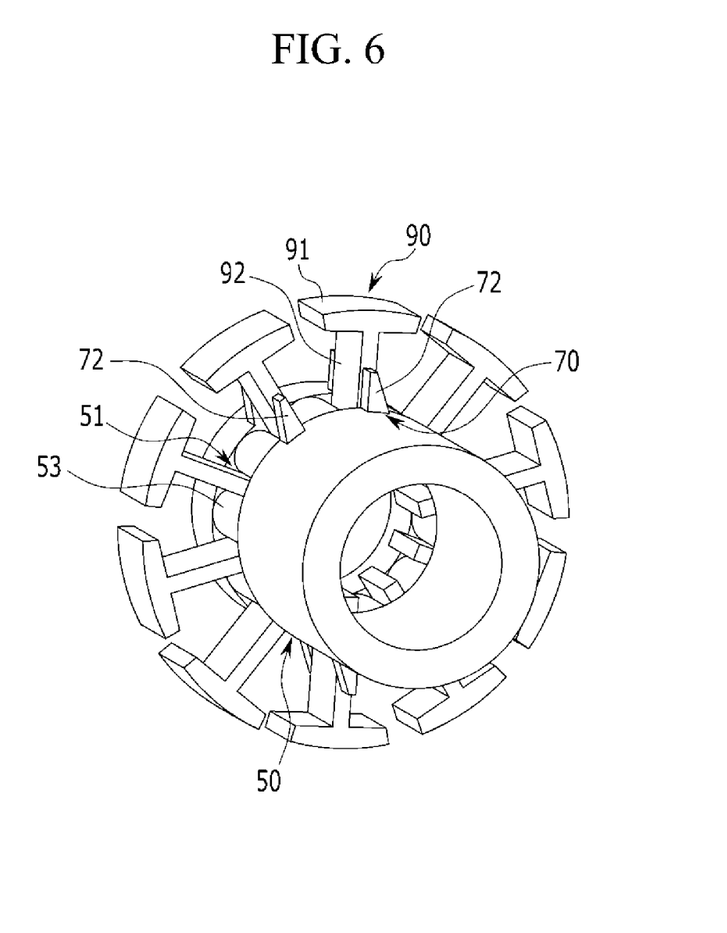
Figure 7:
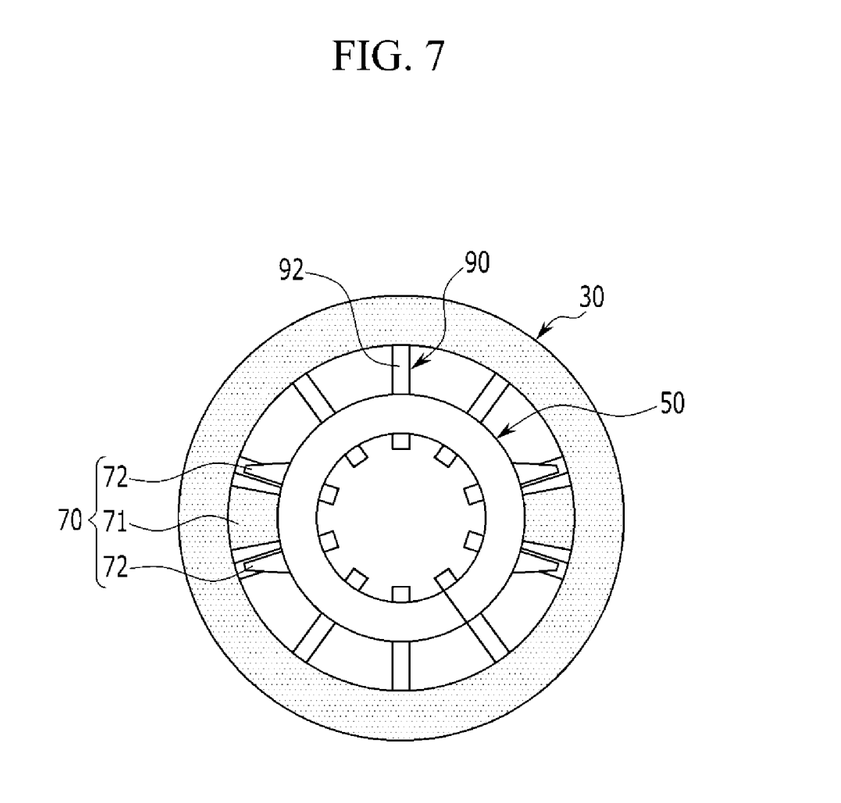

FIG. 5, FIG. 6 and FIG. 7 are views showing a coupled structure of leaf springs used in the pulley assembly according to an exemplary embodiment of the present invention.

Referring to FIGS. 5 and 7 together with FIG. 2, in an exemplary embodiment of the present invention, the leaf springs 90 are radially inserted into the spring hub 30 in the circumferential direction thereof. Therefore, one end portions of the leaf springs 90 are fixed to the spring hub 30, and the other end portions of the leaf springs 90 penetrate the ISG hub 50.

That is, one end portions of the leaf springs 90 are inserted into the first through-holes 31 of the spring hub 30 and are fixed to the external peripheral surface of the spring hub 30, and the other end portions of the leaf springs 90 penetrate the ISG hub 50 through the second through-holes 51 of the ISG hub 50.

The leaf springs 90 have a predetermined elastic coefficient, and have, for example, a "T" shape. Each of the leaf springs 90 includes a fixed portion 91 and a spring portion 92.

The fixed portion 91 is coupled to the external peripheral surface of the spring hub 30, and supports the external peripheral surface of the spring hub 30. The fixed portion 91 is coupled to the fixing groove 33 of the spring hub 30 described above, and supports the external peripheral surface of the spring hub 30. Furthermore, the fixed portion 91 has a curvature corresponding to the external peripheral surface of the spring hub 30.

The spring portion 92, which is connected integrally with the fixed portion 91, is inserted into the first through-hole 31 of the spring hub 30 and the second through-hole 51 of the ISG hub 50. In an exemplary embodiment of the present invention, the leaf springs 90 are not necessarily limited to having the "T" shape, but may also have various shapes as long as it may be inserted into the spring hub 30 and the ISG hub 50 and may be fixed to the spring hub 30.

The reason why the leaf springs 90 are used between the spring hub 30 and the ISG hub 50 is as follows. A general coil spring may support only unidirectional force since opposite distal end portions thereof support force for torsion. However, since the leaf springs 90 as described above may support bidirectional force, in an exemplary embodiment of the present invention, the vibration of the belt generated due to the change in the direction of the torque at the time of the engine starting and the power generation of the ISG system may be absorbed.

Figure 8:
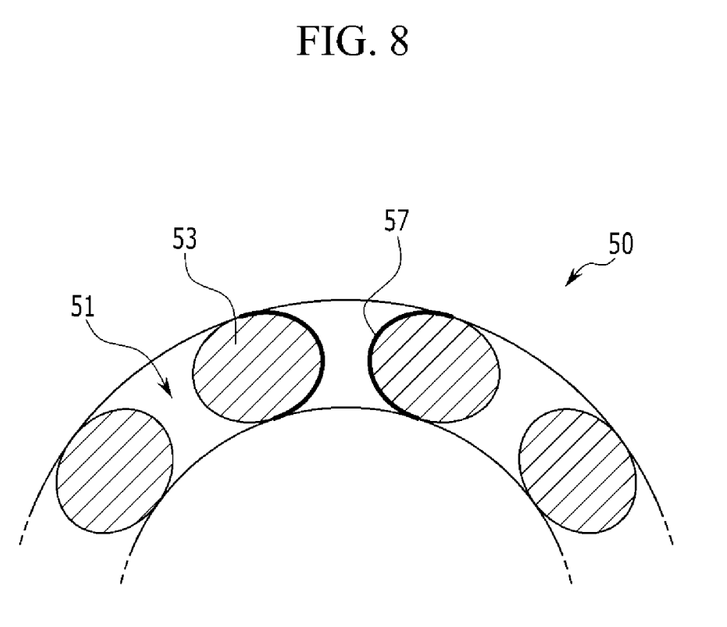
FIG. 8 is a view showing leaf spring mounting holes of an integrated starter generator (ISG) hub used in the pulley assembly according to an exemplary embodiment of the present invention. z

Meanwhile, in an exemplary embodiment of the present invention, the second through-holes 51 of the ISG hub 50 are formed between the ribs 53, as described above. Cross sections of the second through-holes 51 have spline curved lines 57 formed at both sides thereof in the circumferential direction of the ISG hub 50, as shown in FIG. 8.

Hereinafter, an example of configuring the spline curved lines 57 in the cross sections of the second through-holes 51 will be described with reference to FIG. 9.

Figure 9:
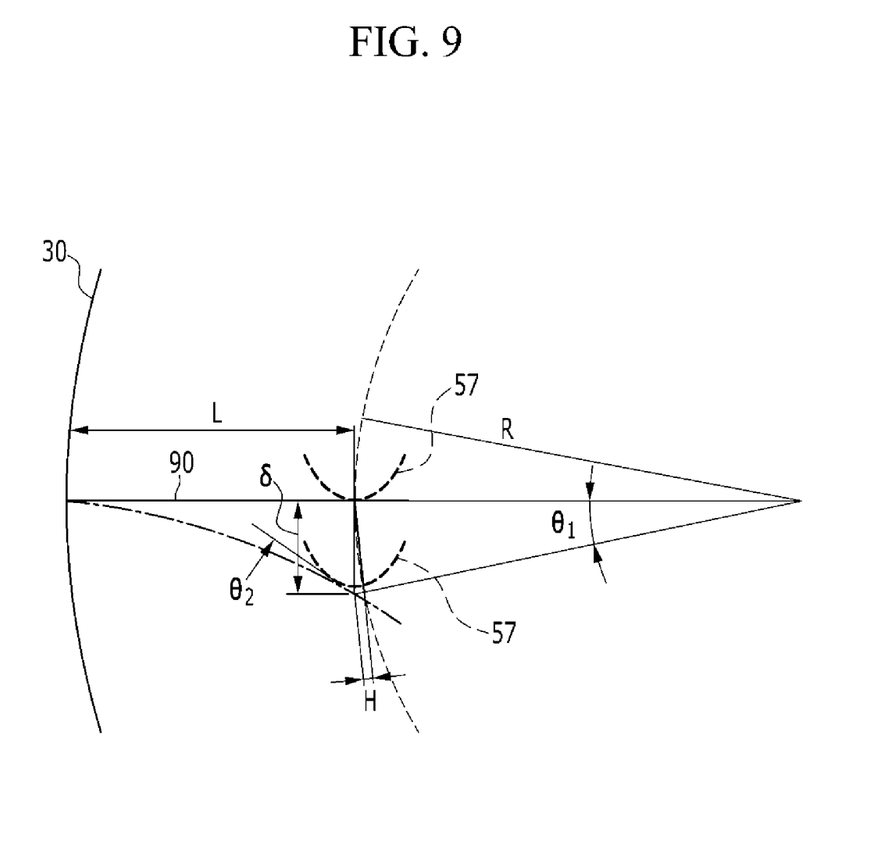
FIG. 9 is a view showing an example of configuring spline curved lines in the leaf spring mounting holes of the ISG hub used in the pulley assembly according to an exemplary embodiment of the present invention.

Referring to FIG. 9, when a length of a load applied to the leaf spring is L, a radius of the spring hub is R, a length at which the leaf spring sags is ∂, an angle of a load end portion of the leaf spring is $\theta_2$, a rotation angle of the ISG hub is $\theta_1$, a distance of the cross section of the second through-hole from the center is H, a Young's modules is E, and a secondary moment of a cross-sectional area is I, if the ISG hub 50 rotates by $\theta_1$, the leaf spring sags by $$\partial = \frac{R}{\tan(\theta_1)}.$$

Furthermore, when it is assumed that L is constant, $$\partial = \frac{PL^3}{3EI} \quad \theta_2 = \frac{PL^2}{2EI}$$

by cantilever sag formulas of $$\theta_2 = \frac{3R}{2\tan(\theta_1)}.$$

Here, P indicates a load.

Therefore, the cross sections of the second through-holes 51 may have spline curved lines connecting between intersection points of tangent lines having an angle of $\theta_2$ at a position distanced from R of the ISG hub 50 by $$H = \frac{R}{\cos(\theta_1)} - R.$$

An operation of the pulley assembly 100 according to an exemplary embodiment of the present invention configured as described above will be described with reference to the above drawings and the accompanying drawings.

Figure 10A:
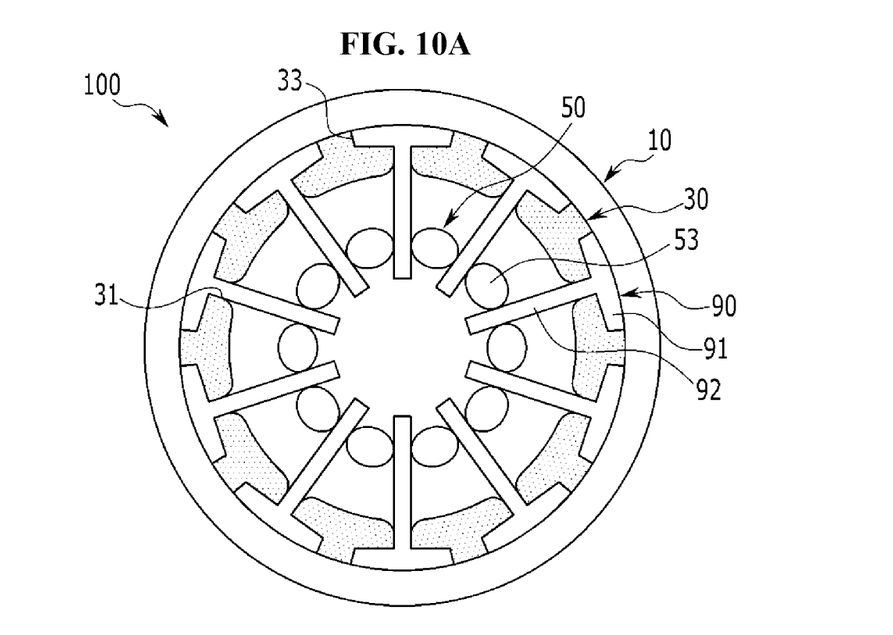
FIG. 10A and FIG. 10B are views for describing an operation of the pulley assembly according to an exemplary embodiment of the present invention.
Figure 10B:
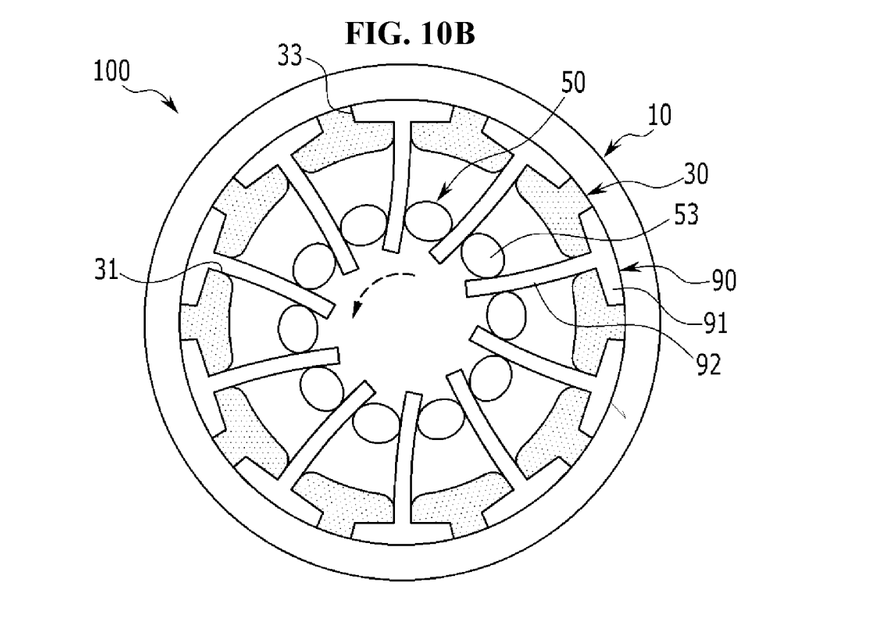

FIG. 10A and FIG. 10B are views for describing an operation of the pulley assembly according to an exemplary embodiment of the present invention.

First, referring to FIG. 10A, in the case in which a torque does not act between the spring hub 30 fixed to the pulley member 10 and the ISG hub 50 rotatably supported to the spring hub 30, the first limiter protrusions 71 of the spring hub 30 are maintained in a state in which they are distanced from the second limiter protrusions 72 of the ISG hub 50 between the second limiter protrusions 72, as shown in FIG. 4A.

In the present state, at the time of the engine starting and the power generation of the ISG system, in an exemplary embodiment of the present invention, a direction of the torque acting on the pulley member 10 is changed, and a torque difference is generated.

In the instant case, as shown in FIG. 10B, the ISG hub 50 rotates in one direction with respect to the spring hub 30. Therefore, the leaf springs 90 absorb the vibration of the belt due to the bidirectional torque difference while the spring portions 92 being bent in a rotating direction of the ISG hub 50 along the spline curved lines 57 by the ribs 53 of the ISG hub 50.

In the process described above, as shown in FIG. 4B, the second limit protrusions 72 of the ISG hub 50 are caught by the first limiter protrusions 71 of the spring hub 30, and the ISG hub 50 does not rotate by the predetermined angle or more with respect to the spring hub 30.

Therefore, in an exemplary embodiment of the present invention, in the case in which the elastic coefficient of the leaf springs 90 is set to be small to absorb the vibration of the belt due to the bidirectional torque difference, the ISG hub 50 does not rotate by the predetermined angle or more by the first and second limiter protrusions 71 and 72, such that a phenomenon in which elastic deformation of the lead springs 90 beyond the yield strength may be prevented.

According to the pulley assembly 100 according to an exemplary embodiment of the present invention as described above, the vibration and noise of the belt generated due to the bidirectional torque difference between the pulley member 10 and the ISG hub 50 at the time of the engine starting and the power generation of the ISG system may be reduced.

Furthermore, in an exemplary embodiment of the present invention, the leaf springs 90 may absorb the vibration of the belt to prevent slip of the belt, resulting in a decrease in slip noise and abrasion of the belt and improvement of durability of the belt, and a decrease in tension of the belt to improve fuel consumption.

Although the pulley assembly 100 connecting the ISG driveshaft 1 and the engine to each other through the belt is described hereinabove in an exemplary embodiment of the present invention, the spirit and scope of the present invention are not limited thereto, but may be applied to a pulley system connected to the crankshaft of the engine through the belt to transfer power to a predetermined driving system.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A pulley assembly connecting an integrated starter generator (ISG) driveshaft of an ISG and an engine to each other through a belt, the pulley assembly comprising:
    a pulley member around which the belt is wound;
    a spring hub fixed to an internal peripheral surface of the pulley member;
    an ISG hub rotatably disposed when the ISG hub is distanced from an internal peripheral surface of the spring hub by a predetermined interval and connected to the ISG driveshaft;
    a limit device provided in the spring hub and the ISG hub and limiting a rotation of the ISG hub to rotation by a predetermined rotation angle; and
    a plurality of leaf springs radially inserted into the spring hub in a circumferential direction thereof, and having a first end portion fixed to the spring hub and a second end portion penetrating the ISG hub,
    wherein the second end portion of the plurality of leaf springs is a free end, and
    wherein the plurality of leaf springs has a "T" shape including the first end portion at an upper portion in each of the plurality of leaf springs having the "T" shape and the second end portion at a lower portion in each of the plurality of leaf springs having the "T" shape.

2. The pulley assembly of claim 1, wherein the limit device includes:
    at least one first limiter protrusion protruding from the internal peripheral surface of the spring hub toward an internal center of the spring hub; and
    second limiter protrusions protruding in pair on an external peripheral surface of the ISG hub with the at least one first limiter protrusion interposed therebetween and having a clearance formed between the second limiter protrusions and the at least one first limiter protrusion and corresponding to the predetermined rotation angle of the ISG hub.

3. The pulley assembly of claim 1, wherein the spring hub has first through-holes formed at predetermined intervals in a circumferential direction thereof.

4. The pulley assembly of claim 3, wherein the spring hub has a fixing groove formed in an external peripheral surface thereof and connected to the first through-holes.

5. The pulley assembly of claim 4, wherein the ISG hub has second through-holes formed at positions each corresponding to the first through-holes.

6. The pulley assembly of claim 5, wherein each of the plurality of leaf springs includes:
    a fixed portion coupled to the fixing groove; and
    a spring portion connected integrally with the fixed portion and inserted into the first and second through-holes.

7. The pulley assembly of claim 5, wherein cross sections of the second through-holes have spline curved lines formed at a first side and a second side thereof in the circumferential direction of the ISG hub.

8. The pulley assembly of claim 1, further including:
    bearings located between first and second end portions of the internal peripheral surface of the spring hub and an external peripheral surface of the ISG hub, respectively.

9. A pulley assembly connecting an integrated starter generator (ISG) driveshaft of an ISG and an engine to each other through a belt, the pulley assembly comprising:
    a pulley member around which the belt is wound;
    a spring hub fixed to an internal peripheral surface of the pulley member, having at least one first limiter protrusion protruding toward an internal center thereof, and having first through-holes formed at predetermined intervals in a circumferential direction thereof;
    an ISG hub connected to the ISG driveshaft, rotatably disposed when the ISG hub is distanced from an internal peripheral surface of the spring hub by a predetermined interval, having a pair of second limiter protrusions formed on an external peripheral surface of the ISG hub and protruding to have a clearance between the pair of second limiter protrusions and the at least one first limiter protrusion with the at least one first limiter protrusion interposed therebetween, and having second through-holes formed at positions each corresponding to the first through-holes;

bearings located between first and second end portions of the internal peripheral surface of the spring hub and the external peripheral surface of the ISG hub, respectively; and a plurality of leaf springs having a first end portion inserted into the first through-holes and fixed to an external peripheral surface of the spring hub and a second end portion penetrating the ISG hub through the second though-holes, wherein the second end portion of the plurality of leaf springs is a free end, and wherein the plurality of leaf springs has a "T" shape including the first end portion at an upper portion in each of the plurality of leaf springs having the "T" shape and the second end portion at a lower portion in each of the plurality of leaf springs having the "T" shape.

10. The pulley assembly of claim 9, wherein the at least one first limiter protrusion and the second limiter protrusions limit a rotation of the ISG hub to rotation by a predetermined rotation angle corresponding to the clearance.

11. The pulley assembly of claim 9, wherein the second limiter protrusions are formed to be distanced from each other in a circumferential direction of the ISG hub.

12. The pulley assembly of claim 9, wherein each of the plurality of the leaf springs includes:
   a fixed portion coupled to the external peripheral surface of the spring hub; and
   a spring portion connected integrally with the fixed portion and inserted into the first and second through-holes.

13. The pulley assembly of claim 12, wherein
   the spring hub has a fixing groove formed in the external peripheral surface thereof and connected to the first through-holes, and
   the fixed portion is coupled to the fixing groove.

14. The pulley assembly of claim 9, wherein the ISG hub has ribs disposed at predetermined intervals in the circumferential direction thereof and disposed in a direction in which the ISG hub is inserted into the spring hub, and has the second through-holes formed between the ribs.

15. The pulley assembly of claim 9, wherein cross sections of the second through-holes have spline curved lines formed at a first side and a second side thereof in the circumferential direction of the ISG hub.

* * * * *